US009652478B2

(12) United States Patent
Gupta

(10) Patent No.: US 9,652,478 B2
(45) Date of Patent: May 16, 2017

(54) METHOD AND APPARATUS FOR GENERATING AN ELECTRONIC DOCUMENT SCHEMA FROM A RELATIONAL MODEL

(71) Applicant: Fannie Mae, Washington, DC (US)

(72) Inventor: Arindam Gupta, Oak Hill, VA (US)

(73) Assignee: Fannie Mae, Washington, DC (US)

( * ) Notice: Subject to any disclaimer, the term of this patent is extended or adjusted under 35 U.S.C. 154(b) by 235 days.

(21) Appl. No.: 14/291,471

(22) Filed: May 30, 2014

(65) Prior Publication Data

US 2015/0347472 A1  Dec. 3, 2015

(51) Int. Cl.
*G06F 17/30*  (2006.01)
*G06F 15/16*  (2006.01)

(52) U.S. Cl.
CPC .. *G06F 17/30294* (2013.01); *G06F 17/30589* (2013.01)

(58) Field of Classification Search
None
See application file for complete search history.

(56) References Cited

U.S. PATENT DOCUMENTS

| | | | |
|---|---|---|---|
| 5,361,201 A | 11/1994 | Jost et al. | |
| 5,966,700 A | 10/1999 | Gould et al. | |
| 7,099,843 B1 | 8/2006 | Cassidy et al. | |
| 7,289,965 B1 | 10/2007 | Bradley et al. | |
| 7,340,431 B1 | 3/2008 | McManus et al. | |
| 7,451,095 B1 | 11/2008 | Bradley et al. | |
| 7,509,261 B1 | 3/2009 | McManus et al. | |
| 7,593,890 B1 | 9/2009 | Bradley et al. | |
| 7,647,272 B1 | 1/2010 | Muren | |
| 7,693,764 B1 | 4/2010 | Gordon et al. | |
| 7,711,574 B1 | 5/2010 | Bradley et al. | |
| 7,792,742 B1 | 9/2010 | Thomas et al. | |
| 7,797,166 B1 | 9/2010 | Bradley et al. | |
| 7,835,919 B1 | 11/2010 | Bradley et al. | |
| 7,882,025 B1 | 2/2011 | Seal et al. | |
| 7,904,381 B1 | 3/2011 | Tatang et al. | |

(Continued)

OTHER PUBLICATIONS

Vandell, Kerry D. "Optimal Comparable Selection and Weighting in Real Property Valuation" AREUEA Journal, vol. 19, No. 2, 1991, pp. 213-239.

(Continued)

*Primary Examiner* — Alex Gofman
(74) *Attorney, Agent, or Firm* — Michael Best & Friedrich LLP

(57) ABSTRACT

Methods and apparatus for generating a schema for data asset information are disclosed. In one example, complex type information corresponding to a logical relational data model that defines an organization of the data asset information is accessed. The logical relational data model includes a parent entity and child entities corresponding to the parent entity. Treating the complex type information produces scrubbed complex type information. The treatment of the complex type information includes, at least, the removal of foreign keys from child entities. The scrubbed complex type information is then translated to produce a hierarchical data model corresponding to the logical relational data model. A schema is then generated for the data asset information based upon the hierarchical data model.

15 Claims, 7 Drawing Sheets

(56) References Cited

U.S. PATENT DOCUMENTS

| | | | |
|---|---|---|---|
| 7,941,365 B1 | 5/2011 | Bradley et al. |
| 7,941,366 B1 | 5/2011 | Bradley et al. |
| 7,945,510 B1 | 5/2011 | Bradley et al. |
| 7,974,854 B1 | 7/2011 | Bradley et al. |
| 7,987,137 B1 | 7/2011 | Thomas et al. |
| 7,996,304 B1 | 8/2011 | Thomas et al. |
| 7,996,313 B1 | 8/2011 | McMurray et al. |
| 8,010,377 B1 | 8/2011 | Bradley et al. |
| 8,046,306 B2 | 10/2011 | Stinson |
| 8,108,302 B1 | 1/2012 | Bradley et al. |
| 8,140,421 B1 | 3/2012 | Humphries et al. |
| 8,209,258 B1 | 6/2012 | Seal et al. |
| 8,239,318 B1 | 8/2012 | Bradley et al. |
| 8,244,563 B2 | 8/2012 | Coon et al. |
| 8,255,320 B1 | 8/2012 | Seal et al. |
| 8,280,806 B1 | 10/2012 | Bradley et al. |
| 8,326,749 B1 | 12/2012 | Seal et al. |
| 8,386,395 B1 | 2/2013 | Gordon et al. |
| 8,401,868 B1 | 3/2013 | Bradley et al. |
| 8,401,961 B1 | 3/2013 | McMurray et al. |
| 8,447,688 B1 | 5/2013 | Thomas et al. |
| 8,521,644 B1 | 8/2013 | Hanson et al. |
| 2003/0055822 A1* | 3/2003 | Yu | G06F 17/30371 |
| 2005/0154656 A1 | 7/2005 | Kim et al. |
| 2005/0154657 A1 | 7/2005 | Kim et al. |
| 2006/0020586 A1* | 1/2006 | Prompt | G06F 17/30893 |
| 2007/0143331 A1* | 6/2007 | Holtz | G06F 17/2247 |
| 2008/0004893 A1 | 1/2008 | Graboske |

OTHER PUBLICATIONS

Gau, George W., et al. "Optimal Comparable Selection and Weighting in Real Property Valuation: An Extension" Journal of the American Real Estate and Urban Economics Association vol. 20, No. 1, 1992, pp. 107-123.

* cited by examiner

```
<xsd:element name="Collateral">
  <xsd:complexType>
    <xsd:complexContent>
      <xsd:extension base="CollateralType">
        <xsd:attribute name="schemaVersion" fixed="1.0"/>
      </xsd:extension>
    </xsd:complexContent>
  </xsd:complexType>
</xsd:element>
```
⎵ 300

```
<xsd:complexType name="CollateralType">
  <xsd:sequence>
    <xsd:element name="CollateralIdentifier" type="stypes:Decimal20.2"/>
    <xsd:element name="PostingPartyIdentifier" type="stypes:String30"/>
    <xsd:element name="LocationPartyIdentifier" type="stypes:String30"/>
    <xsd:element name="AssetTypeCode" type="stypes:String30"/>
    <xsd:element name="AgreementTypeCode" type="stypes:String30"/>
    <xsd:element name="ReportDate" type="xsd:date"/>
    <xsd:element name="PartyName" type="stypes:String200" minOccurs="0"/>
    <xsd:element name="AssetTypeName" type="stypes:String200" minOccurs="0"/>
    <xsd:element name="AgreementName" type="stypes:String200" minOccurs="0"/>
    <xsd:element name="AccountNumber" type="stypes:String20" minOccurs="0"/>
    <xsd:element name="DataSourceIdentifier" type="stypes:String30" minOccurs="0"/>
    <xsd:element name="CollateralDetail" type="CollateralDetailType"/>
  </xsd:sequence>
</xsd:complexType>
```
⎵ 301, 340, 360

FIG.3A

```
<xsd:complexType name="CollateralDetailType">
  <xsd:choice>
    <xsd:element name="Cash" type="CashDetailType"/>
    <xsd:element name="Security" type="SecurityDetailType"/>
    <xsd:element name="LetterOfCredit" type="LOCDetailType"/>
  </xsd:choice>
</xsd:complexType>
```
⎴
360

```
<xsd:complexType name="CashDetailType">
  <xsd:sequence>
    <xsd:element name="Amount" type="stypes:Decimal20.2"/>
  </xsd:sequence>
</xsd:complexType>
```
⎴
302

FIG.3B

```
<xsd:complexType name="SecurityDetailType">
  <xsd:sequence>
    <xsd:element name="FinancialInstrumentTypeCode" type="stypes:String30"/>
    <xsd:element name="FinancialInstrumentTypeName" type="stypes:String200" minOccurs="0"/>
    <xsd:element name="IssuerIdentifier" type="stypes:String30"/>
    <xsd:element name="CUSIPIdentifier" type="stypes:String9" minOccurs="0"/>
    <xsd:element name="MaturityDate" type="xsd:date" minOccurs="0"/>
    <xsd:element name="CurrentInterestRate" type="stypes:Decimal14.10" minOccurs="0"/>
    <xsd:element name="CurrentFaceAmount" type="stypes:Decimal20.2" minOccurs="0"/>
    <xsd:element name="PaydownFactor" type="stypes:Decimal14.10" minOccurs="0"/>
    <xsd:element name="PARAmount" type="stypes:Decimal20.2" minOccurs="0"/>
    <xsd:element name="CurrentMarketPricePercent" type="stypes:Decimal14.10" minOccurs="0"/>
    <xsd:element name="CurrentMarketValueAmount" type="stypes:Decimal20.2" minOccurs="0"/>
    <xsd:element name="HaircutValueAmount" type="stypes:Decimal20.2" minOccurs="0"/>
  </xsd:sequence>
</xsd:complexType>
```
{ 304

```
<xsd:complexType name="LOCDetailType">
  <xsd:sequence>
    <xsd:element name="IssuerIdentifier" type="stypes:String30"/>
    <xsd:element name="IssueDate" type="xsd:date"/>
    <xsd:element name="ExpirationDate" type="xsd:date"/>
    <xsd:element name="CreditTypeCode" type="stypes:String30"/>
    <xsd:element name="CreditNumber" type="stypes:String30" minOccurs="0"/>
    <xsd:element name="CreditAmount" type="stypes:Decimal20.2" minOccurs="0"/>
    <xsd:element name="CreditTypeName" type="stypes:String100" inOccurs="0"/>
  </xsd:sequence>
</xsd:complexType>
```
{ 306

FIG.3C

METHOD AND APPARATUS FOR GENERATING AN ELECTRONIC DOCUMENT SCHEMA FROM A RELATIONAL MODEL

BACKGROUND OF THE INVENTION

This application relates generally to generating electronic document schemas and more specifically to generating an electronic document schema from a relational model.

SUMMARY OF THE INVENTION

Methods and apparatus for generating a schema for data asset information are disclosed. In one example, complex type information corresponding to a logical relational data model that defines an organization of the data asset information is accessed. One example of a data asset is a collateral asset. The logical relational data model includes a parent entity and child entities corresponding to the parent entity. Treating the complex type information produces scrubbed complex type information. The treatment of the complex type information includes, at least, the removal of foreign keys from child entities. The scrubbed complex type information is then translated to produce a hierarchical data model corresponding to the logical relational data model. A hierarchical schema is then generated for the collateral asset information based upon the relational data model.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIGS. 3A-C are diagrams illustrating a text form XML schema corresponding to the hierarchical data model of FIG. 2.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

According to one aspect, this application provides a process for building common XML schemas, such as those corresponding to logical data models of an enterprise. In the example of an enterprise, the common XML scheme may be referred to as an Enterprise Common Format (ECF). These ECFs are to act as the primary containers for data in motion across the enterprise.

The basic approach entails a top-down analysis of the data model, identifying the lowest level entities in the relational model and then moving up the chain to build the parent child relationship with the necessary constraints and cardinality at each level.

Figure 1:
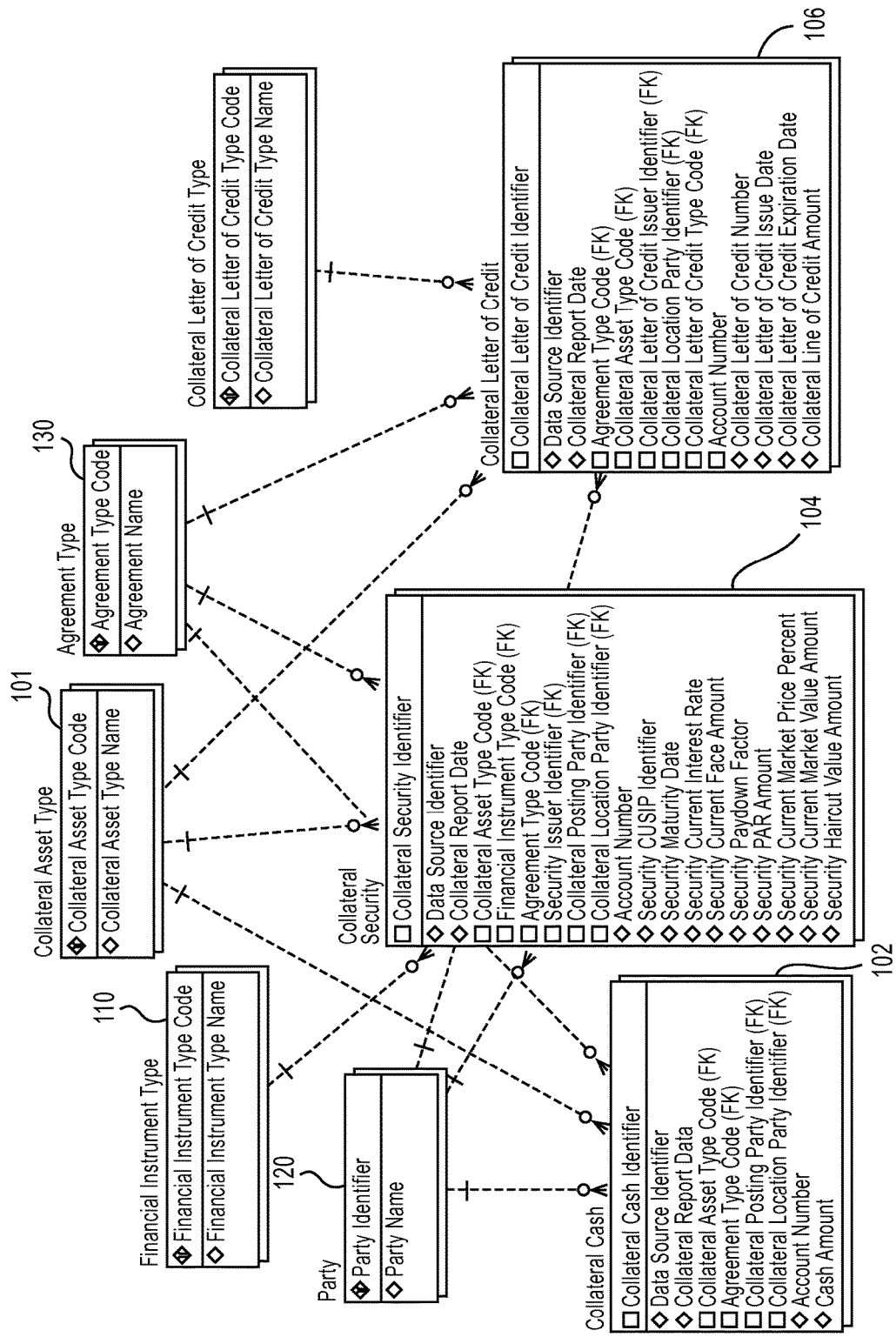
FIG. 1 is a schematic diagram graphically illustrating a logical relational data model.
Figure 2:
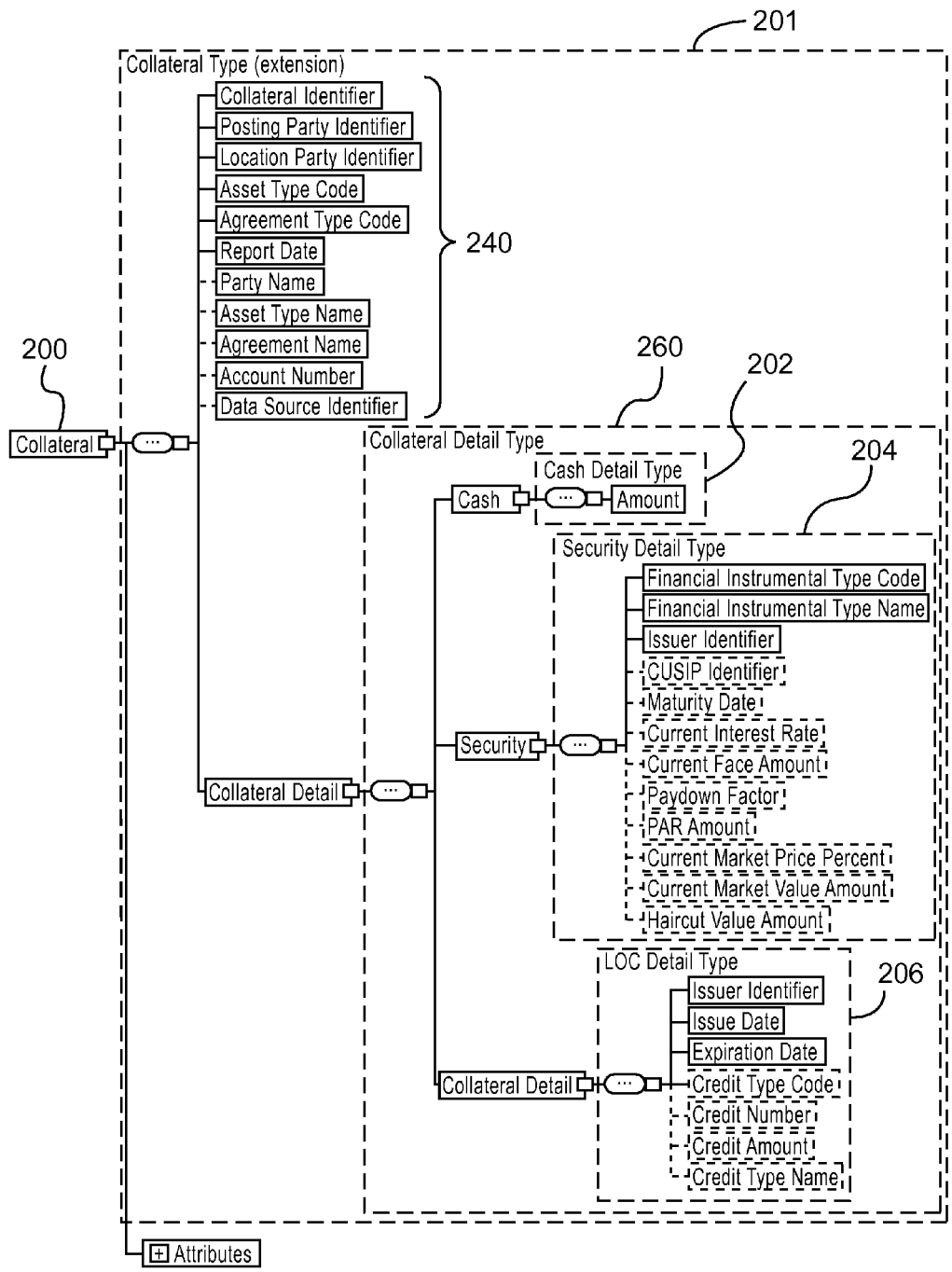
FIG. 2 is a schematic diagram graphically illustrating a corresponding hierarchical data model.

FIG. 1 is a schematic diagram illustrating an example of a logical data model 100, FIG. 2 is a schematic diagram illustrating an example of a graphical depiction of a corresponding XML schema 200, and FIG. 3 is an illustrative example of the corresponding XML schema 300 in text form. These figures are initially presented to provide an overview of what might constitute a data model and corresponding XML schema, for a foundational understanding of the XML schema generation process described further below.

It should be appreciated that interpreting the logical model correctly plays a significant role in the design of the XML schema. Understanding the business process architecture can greatly enhance and optimize the quality of the schema. Careful analysis of the relational data model is the starting point in identifying the building blocks of the corresponding XML schema. This includes recognizing the atomic entities (leaf nodes), the intermediate entities and finally the top level entities. It is also useful to identify references to entities that may not be part of the core model being worked on.

FIG. 1 illustrates an example of a logical data model 100. The following observations are evident from the depiction of the model 100:

1. There are three types of collateral assets 101—Cash 102, Security 104 and Letter of Credit 106.
2. Security 104 is a type of Financial Instrument 110 and hence is also associated with that entity.
3. All three types of collateral assets are associated with the Party entity 120.
4. All three types of collateral assets are associated with the Agreement Type 130.
5. The Financial Instrument 110, Party 120 and Agreement Type 130 are external to the core definition of collateral asset 101.
6. The 1:N relationship between Party 120 and Collateral Assets (102-106) or Agreement Type 130 and Collateral Assets (102-106) signifies that the Party 120 or Agreement Type 130 schema will have repeating reference to the collateral object. A collateral asset schema should provision a placeholder for these foreign keys.

Building an XML schema based on this model thus implements the following building blocks in the design:

1. Providing a parent (and possibly intermediate) container to represent a collateral asset type.
2. Providing sub-containers to represent specific asset types.
3. Capturing the relationships to external entities.

Before further description of the details of building the schema, it is helpful to understand the basic mechanism involved in translating a relational model into a hierarchical model. If one looks closely at the logical data model 100 in FIG. 1, it is clear that each of the collateral subtypes carry necessary foreign keys, which is an important ingredient for referential integrity in the relational model. However, in a hierarchical model such a relationship is implicit in the parent-child relationship. This concept is described further below.

Although a variety of design patterns may be implemented in accordance with this description, in the presently described example the schema design pattern is referred to as the Venetian Blind pattern. In this pattern, all the basic building blocks are defined as complex types with one root element holding the tree together.

It is evident from the model 100 that at least three base complex types should be defined—in this example they are named CashDetailType, SecurityDetailType and LineOfCreditDetailType. The next step is to determine what attributes to put in each of these base complex types. Here, in lieu of making a copy of all the attributes from the data model, the unique attributes in each of the base complex types will be identified. The hierarchical model eliminates the need to duplicate keys and other common attributes and facilitates encapsulation in parent containers.

FIG. 2 is a schematic diagram illustrating an example of a hierarchical model for a corresponding XML schema 200 denoted Collateral, and FIGS. 3A-C depict an illustrative example of the corresponding XML schema 300 in text form.

With reference to the logical data model 100, all the attributes that are marked foreign key (FK) and some other common attributes like Data Source Identifier, Collateral Report Date, Account Number, etc. (240, 340) may be moved to a higher level container.

In the case of CashDetailType 202, 302, this leaves one unique attribute—'Cash Amount'—to define the type. SecurityDetailType 204, 304 and LOCDetailType 206, 306 are also illustrated, each having several attributes.

Moving one step up the hierarchy a complex type called CollateralDetailType 260, 360 serves as the container with a choice for one of the base types. This is necessary since at any given point in time a collateral asset can only be of one type.

Finally, a super complex type that holds all the common attributes and a link to the CollateralDetailType is defined—here, it is called Collateral Type 201, 301. This is the top level type that models the XML representation of the collateral asset data.

With this understanding of an example of a logical data model 100, and corresponding graphical XML schema 200 and text XML schema 300, an aspect of automatically generating a schema from a logical data model is now further described.

Before proceeding with the discussion, it should be noted that although certain attribute names are used in this description, such names may be varied according to the practices adopted by the enterprise implementing schema generation in accordance with this description. The generally accepted practice is to align with the naming standards of the logical data model. However, since these schemas represent data in motion and attribute names build the tags, the schema designers often have to be mindful about payload size and impact on performance—accordingly, deviation in labeling can be expected.

In building an Enterprise Common Format (ECF) from a logical model, it is important to codify and automate the process to ensure repeatability, traceability and hence quality. At a minimum, attribute and entity level compliance with the logical model should be guaranteed to the extent possible. Also, the change management process should be configured so that it is relatively straightforward and convenient.

Figure 4:
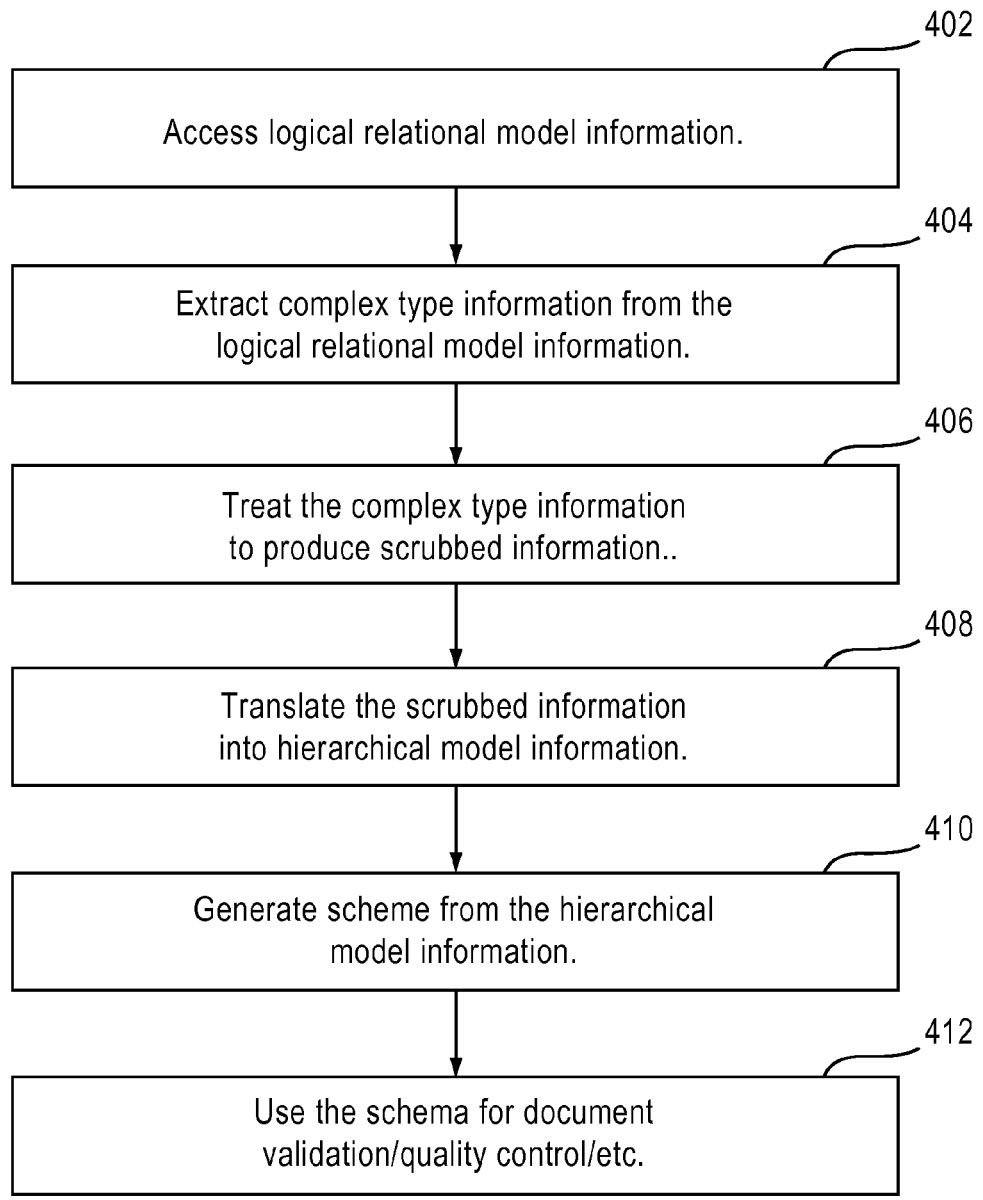
FIG. 4 is a flow diagram illustrating a process for automatically generating an enterprise common format schema.

FIG. 4 is a flow diagram illustrating a process 400 for automatically generating an electronic document schema.

Initially, the logical model information is accessed 402. This may be in the form of a logical model data file that is generated and saved as a particular file type by conventional logical modeling software. The logical model file may be established as a result of comprehensive collaboration within an enterprise to determine the constituent components of the logical relational model file, such as the example depicted in FIG. 1 and described above.

The process 400 continues with extraction 404 of complex type information from the logical model information. Examples of complex data types that are extracted from the logical model information are also described above, in connection with FIGS. 1-3. In one embodiment, Embarcadero's ERSStudio XML export facility may be used to extract entities as the complex type information.

The complex type information is then scrubbed 406 to produce a dataset that can be translated 408 into hierarchical model information. The scrubbing process adds any necessary namespace information, replaces data types to conform to target standards, removes foreign keys from child entities, and otherwise prepares the dataset for translation. Additional details regarding the scrubbing criteria are described further below. The scrubbing process (406) creates a schema file comprising the atomic entities as defined in the data model. The translation process (408) then translates the relational model to a hierarchical model according to defined relationships between them that are reflected in program code executable to carry out the translation. The final schema is then generated 410 from the hierarchical model information.

The schema is used 412 for a variety of concrete processes including the validation of electronic documents (i.e., ensuring that an electronic document that has been or will be used in a transaction meets the requirements of the schema), or for various quality control procedures during the preparation or use of electronic documents. A preferred example is financial transactions as described herein.

Figure 5:
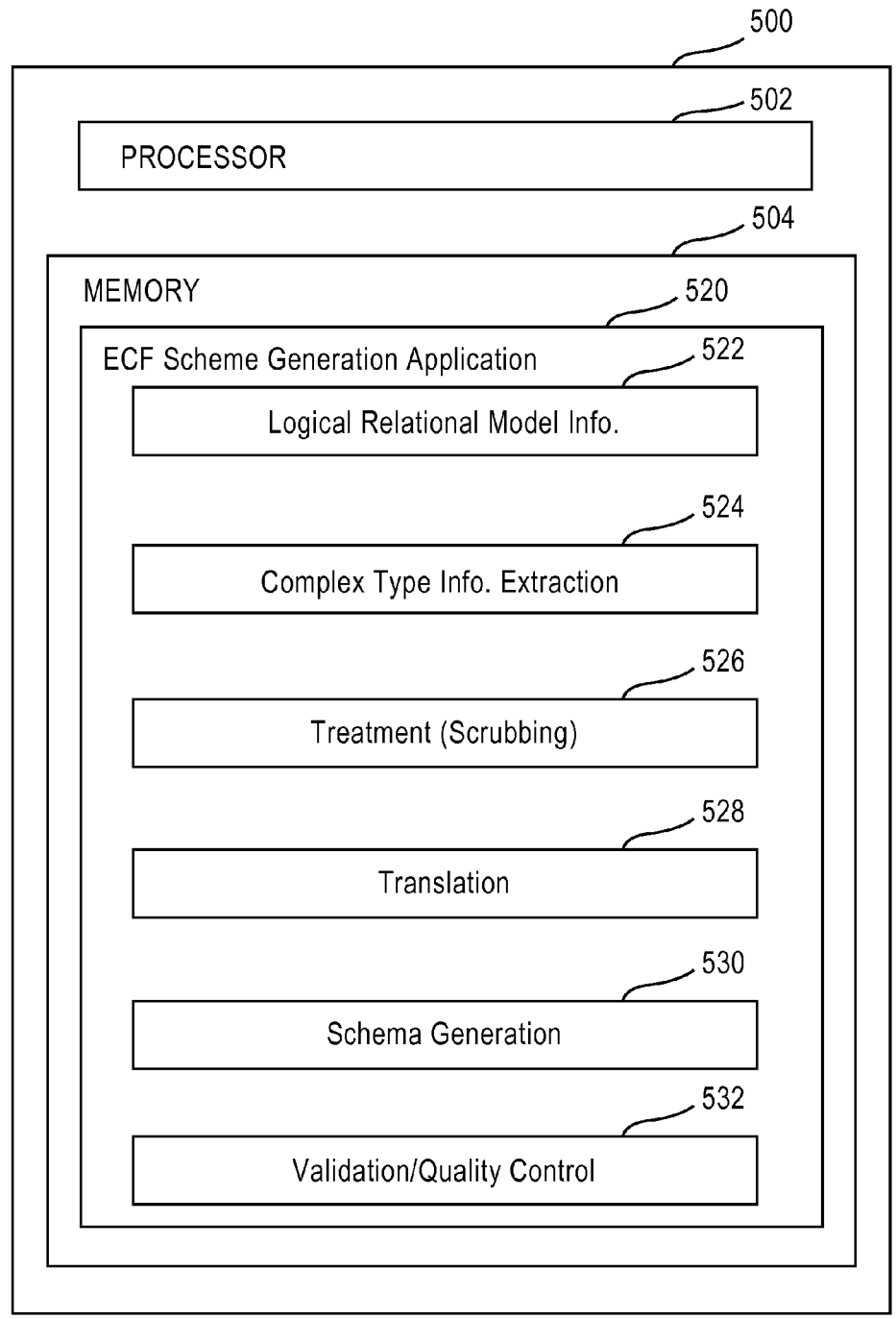
FIG. 5 is a block diagram illustrating an example of an apparatus and corresponding application for ECF schema generation.

FIG. 5 is block diagram illustrating an example of an electronic document schema generation application 520 that includes a logical model information module 522, a complex type information extraction module 524, a scrubbing module 526, a translation module 528, a schema generation module 530, and a validation and quality control module 532.

The electronic document schema generation application 520 is hosted by a computing device 500 that includes a processor 502 and memory 504. The application 520 is comprised of program code that may be stored in the memory 504 for execution by the processor to carry out the functionality described herein. The application 520 may also be stored on various computer readable media. Although the application 520 is preferably provided as software, it may alternatively be provided as hardware or firmware, or any combination of hardware, firmware and /or software. Additionally, although the application 520 is illustrated as including certain modules, the functionality may be provided using greater, fewer or differently named modules.

As noted above, the application 520 includes program code for providing the functionality described herein. In one example, this is carried out using meta-language defined according to schemas as described herein. The following functions are provided:

1. Defining data type translations (i.e., rules to translate database data types to XML data types).

2. Foreign key scrubbing from child entities—relational data models require foreign key identification for relational integrity but implicit parent-child relationship in a hierarchical XML model renders that redundant and unnecessary.

3. Merging of child entities where necessary to reduce XML tree depth.

4. Defining nested complex types.

5. Defining 'choice' constructs.

6. Indicating cardinality of relationship between entities i.e. one-to-one, one-to-many etc.

7. Defining relational constraints (e.g., mandatory vs. optional).

8. Defining sub-schemas with different roots.

9. Versioning root elements individually.

The meta-language is used for the scrubbing functionality, and for building the relationship hierarchy between entities for the defined subject matter. The complete schemas defining the meta-language are respectively provided in Appendix A and Appendix B.

Some examples of meta-language based definitions are provided below to illustrate examples of use cases.

1. Define data type translation—literal—e.g., any occurrence of a string maxOccurs="1" minOccurs="1" is replaced with an 'empty' string:

```
<ReplacementTag>
<ReplacementType>Literal</ReplacementType>
<sourceContains>maxOccurs="1" minOccurs="1"</sourceContains>
<From>maxOccurs="1" minOccurs="1"</From>
<To></To>
</ReplacementTag>
```

2. Define data type translation—functional—e.g., a predefined function is executed when the defined string is encountered:

```
    <ReplacementTag>
        <ReplacementType>Function</ReplacementType>
        <sourceContains>complexType name</sourceContains>
        <Function>setCurrentComplexTypeName</Function>
    </ReplacementTag>
```

3. Foreign key substitution—e.g., this definition indicates that the attribute named SecurityCUSIPIdentifier should be scrubbed from all entities other than the one defined as the PrimaryEntityName:

```
    <ForeignKeyIdentifier>
    <FKName>SecurityCUSIPIdentifier</FKName>
    <PrimaryEntityName>Security</PrimaryEntityName>
    </ForeignKeyIdentifier>
```

4. Entity merge—e.g., the following merges the child entity into the parent creating one primary entity:

```
<ComplexTypeMergeDefinition>
<ParentTypeName>FinancialInstrumentBusinessEventBase</ParentTypeName>
<ChildTypeName>BusinessEventBase</ChildTypeName>
</ComplexTypeMergeDefinition>
```

5. Complex type definition with Choice construct—e.g., the following sets up the two child entities as an exclusive choice construct under the parent thereby defining another sub-complex type:

```
    <SupertypeDef>
    <SupertypeType>Complex</SupertypeType>
    <SupertypeName>LoanPriceExtendedBase</SupertypeName>
    <SupertypeBase>LoanPriceBase</SupertypeBase>
    <ChildrenInChoiceGroup Required="true">
    <Child>
    <Name>LoanCreditPrice</Name>
    <Type>LoanCreditPriceExtendedBase</Type>
    <Cardinality>Optional</Cardinality>
    </Child>
    <Child>
    <Name>LoanMarketPrice</Name>
    <Type>LoanMarketPriceExtendedBase</Type>
    <Cardinality>Optional</Cardinality>
    </Child>
    </ChildrenInChoiceGroup>
    /SupertypeDef>
```

6. Versioned root complex type definition—e.g., a complex type defining a root element and carrying a version attribute is defined as follows:

```
    <SupertypeDef versioned="true">
    <SupertypeType>Complex</SupertypeType>
    <SupertypeName>Loan</SupertypeName>
    <SupertypeBase>LoanExtendedBase</SupertypeBase>
    </SupertypeDef>
```

Scrubbing the exported schema file:

Scrubbing the exported schema file, comprised of complex type information, is also carried out by the program code (e.g., a Java program). The program code preferably includes the following elements:

a. Logic to read and execute the scrubbing rules as defined using the meta-language.

b. Logic to read the configuration file that defines the hierarchical relationships and cardinality.

c. A utility tool for scrubbing the complex type information to produce schemas that are compliant with the target design standards and data types. For example, this utility may be run on the complex type information output from ER Studio to generate a schema that contains the base complex types corresponding to the logical entities in the data model.

d. A utility to generate the final XML schema based on the hierarchical relationship described in a configuration file using the meta-language described above.

The following user-configurable variables are also established in connection with accessing the logical model information and complex type information, as well as scrubbing and translation.

<InputSchemaFileName>—identify and address the schema file to be subject to scrub and translation.

<RootElementCount>—indicate how many root elements are required in the final schema—this is typically 1 in most cases.

<TargetNamespaceName>—define the target namespace taking care to ensure the major versioning number is correct.

<ReplacementTags>—define the tags from the source schema file that requires translation.

<DataTypeReplacements>—complete this section based on the data types defined in the logical model. Typically based upon existing template.

<ForeignKeyIdentifiers>—identifies the entities where the primary keys are required—the scrubbing process removes the foreign key references from the child entities.

<ComplexTypeMergeDefinitions>—if entities from the logical model require to be merged in the final schema to reduce unnecessary XML graph depth, define such merges in this section.

The translation portion is an important function of the tool where it interprets the configuration as described using the meta-language and produces the final schema document that is in compliance with XML schema grammar. The translation process intelligently builds the intermediate super types and strings them together to produce the final tree.

Thus embodiments of the present invention produce and provide automatically generating electronic document schema from source logical model. Although the present invention has been described in considerable detail with reference to certain embodiments thereof, the invention may be variously embodied without departing from the spirit or scope of the invention. Therefore, the following claims should not be limited to the description of the embodiments contained herein in any way.

APPENDIX A

Base type scrub schema

```xml
<?xml version="1.0" encoding="UTF-8"?>
<!-- This schema defines the meta language that is used to scrub the output from the source
logical model information to generate the base schema file containing the atomic entities with
their attributes. The configuration file generated using this schema feeds the base schema
scrubber. -->
<xsd:schema xmlns:xsd="http://www.w3.org/2001/XMLSchema"
xmlns="http://www.fanniemae.com/enterprisedata/utility/schemagen/v1.x"
targetNamespace="http://www.fanniemae.com/enterprisedata/utility/schemagen/v1.x"
elementFormDefault="qualified" attributeFormDefault="unqualified">
    <xsd:element name="SchemaGeneratorConfig">
        <xsd:complexType>
            <xsd:sequence>
                <xsd:element name="BaseTypeSchemaConfig"
                type="BaseTypeSchemaConfig" minOccurs="0"/>
            </xsd:sequence>
        </xsd:complexType>
    </xsd:element>
    <xsd:complexType name="BaseTypeSchemaConfig">
        <xsd:sequence>
            <xsd:element name="InputSchemaFileName" type="xsd:string">
                <xsd:annotation>
                    <xsd:documentation>This is the schema file generated
                    from ERStudio
                    </xsd:documentation>
                </xsd:annotation>
            </xsd:element>
            <xsd:element name="OutputSchemaFileName" type="xsd:string">
                <xsd:annotation>
                    <xsd:documentation>This the Fannie standard
                    compliant scrubbed version
                    </xsd:documentation>
                </xsd:annotation>
            </xsd:element>
            <xsd:element name="RootElementCount" type="xsd:int">
                <xsd:annotation>
                    <xsd:documentation>Indicates the number of root
                    elements required in the final schema - a set of base types is
                    created for each root to manage PK/FK scrubbing
                    </xsd:documentation>
                </xsd:annotation>
            </xsd:element>
            <xsd:element name="TargetNamespaceName" type="xsd:string"
            minOccurs="0">
                <xsd:annotation>
                    <xsd:documentation>The target nsmaespace to be
                    included in the schema
                    </xsd:documentation>
                </xsd:annotation>
            </xsd:element>
            <xsd:element name="NamespaceImports" type="NamespaceImports"
            minOccurs="0">
                <xsd:annotation>
                    <xsd:documentation>Names of schemas to be imported
                    </xsd:documentation>
                </xsd:annotation>
            </xsd:element>
            <xsd:element name="ReplacementTags" type="ReplacementTags"
            minOccurs="0">
                <xsd:annotation>
```

APPENDIX A-continued

Base type scrub schema

```
                <xsd:documentation>Defines the source and target tags
            to be replaced in the output schema
                </xsd:documentation>
            </xsd:annotation>
        </xsd:element>
        <xsd:element name="DataTypeReplacements"
    type="DataTypeReplacements" minOccurs="0">
            <xsd:annotation>
                <xsd:documentation>Defines the datatype translations
            from data model to XML schema types
                </xsd:documentation>
            </xsd:annotation>
        </xsd:element>
        <xsd:element name="ForeignKeyIdentifiers"
    type="ForeignKeyIdentifiers" minOccurs="0">
            <xsd:annotation>
                <xsd:documentation>Defines which entities should hold
            on to the primary keys - this key when encountered in other
            entities are treated as foreign keys and removed as part of the
            relational to hierarchical translation
                </xsd:documentation>
            </xsd:annotation>
        </xsd:element>
        <xsd:element name="ComplexTypeMergeDefinitions"
    type="ComplexTypeMergeDefinitions" minOccurs="0">
            <xsd:annotation>
                <xsd:documentation>Defines the complex types that
            needs to be merged into a single complex
            type</xsd:documentation>
            </xsd:annotation>
        </xsd:element>
    </xsd:sequence>
</xsd:complexType>
<xsd:complexType name="DataTypeReplacementBase">
    <xsd:sequence>
        <xsd:element name="AttributeName" type="xsd:string"
    minOccurs="0"/>
        <xsd:element name="From" type="xsd:string"/>
        <xsd:element name="To" type="xsd:string"/>
    </xsd:sequence>
</xsd:complexType>
<xsd:complexType name="DataTypeReplacements">
    <xsd:sequence>
        <xsd:element name="DataTypeReplacement"
    type="DataTypeReplacementBase" maxOccurs="unbounded"/>
    </xsd:sequence>
</xsd:complexType>
<xsd:complexType name="ReplacementTagBase">
    <xsd:sequence>
        <xsd:element name="ReplacementType" type="ReplacementType"/>
        <xsd:element name="sourceContains" type="xsd:string"/>
        <xsd:element name="From" type="xsd:string" minOccurs="0"/>
        <xsd:element name="To" type="xsd:string" minOccurs="0"/>
        <xsd:element name="Function" type="xsd:string" minOccurs="0"/>
    </xsd:sequence>
</xsd:complexType>
<xsd:complexType name="ReplacementTags">
    <xsd:sequence>
        <xsd:element name="ReplacementTag" type="ReplacementTagBase"
    maxOccurs="unbounded"/>
    </xsd:sequence>
</xsd:complexType>
<xsd:complexType name="NamespaceImports">
    <xsd:sequence>
        <xsd:element name="NamespaceImport"
    type="NamespaceImportBase" maxOccurs="unbounded"/>
    </xsd:sequence>
</xsd:complexType>
<xsd:complexType name="NamespaceImportBase">
    <xsd:sequence>
        <xsd:element name="NamespaceName" type="xsd:string"/>
        <xsd:element name="SchemaFileName" type="xsd:string"/>
        <xsd:element name="NamespacePrefix" type="xsd:string"/>
    </xsd:sequence>
</xsd:complexType>
<xsd:complexType name="ForeignKeyIdentifiers">
    <xsd:sequence>
        <xsd:element name="ForeignKeyIdentifier"
```

APPENDIX A-continued

Base type scrub schema

```
                type="ForeignKeyIdentifierBase" maxOccurs="unbounded"/>
            </xsd:sequence>
        </xsd:complexType>
        <xsd:complexType name="ForeignKeyIdentifierBase">
            <xsd:sequence>
                <xsd:element name="FKName" type="xsd:string"/>
<!--The PrimaryEntityName elements indicates the entities for which the above key is the
primary key and we want it to remain in the entity. This attruibute will be removed from all
other entities which are typically children in some branches. If this element is missing then
the key identified will be removed from all entities -->
                <xsd:element name="PrimaryEntityName" type="xsd:string"
            minOccurs="0" maxOccurs="unbounded"/>
            </xsd:sequence>
        </xsd:complexType>
        <xsd:complexType name="ComplexTypeMergeDefinitions">
            <xsd:sequence>
                <xsd:element name="ComplexTypeMergeDefinition"
            type="ComplexTypeMergeDefinition" maxOccurs="unbounded"/>
            </xsd:sequence>
        </xsd:complexType>
        <xsd:complexType name="ComplexTypeMergeDefinition">
            <xsd:sequence>
                <xsd:element name="ParentTypeName" type="xsd:string"/>
                <xsd:element name="ChildTypeName" type="xsd:string"
            maxOccurs="unbounded"/>
            </xsd:sequence>
        </xsd:complexType>
        <xsd:simpleType name="ReplacementType">
            <xsd:restriction base="xsd:string">
                <!-- Indiactes that a function needs to be invoked for translation -->
                <xsd:enumeration value="Function"/>
                <!-- Indicates literal string replacement -->
                <xsd:enumeration value="Literal"/>
            </xsd:restriction>
        </xsd:simpleType>
</xsd:schema>
```

APPENDIX B

Super type generator schema

```
<?xml version="1.0" encoding="UTF-8"?>
<!-- This schema defines the meta language used to build the relationship hierarchy between
entities for a given subject area. Once the rules are captured in the configuration file based on
this schema, the program can be used repeatedly to generate the identical schema. -->
<xsd:schema xmlns:xsd="http://www.w3.org/2001/XMLSchema"
xmlns="http://www.fanniemae.com/enterprisedata/utility/schemasupertypegen/v1.x"
targetNamespace="http://www.fanniemae.com/enterprisedata/utility/schemasupertypegen/v1.
x" elementFormDefault="qualified" attributeFormDefault="unqualified">
        <xsd:element name="SchemaSupertypesGeneratorConfig">
            <xsd:complexType>
                <xsd:sequence>
                    <xsd:element name="SchemaSupertypesConfig"
                type="SchemaSupertypesConfig" minOccurs="0"/>
                </xsd:sequence>
            </xsd:complexType>
        </xsd:element>
        <xsd:complexType name="SchemaSupertypesConfig"><!-- This is the top level type
that brings all the elements necessary to output the final schema file -->
            <xsd:sequence>
                <xsd:element name="OutputSchemaFileName" type="xsd:string"/><! --
            Name of the schema file -->
                <xsd:element name="TargetNamespaceName" type="xsd:string"
            minOccurs="0"/>
                <xsd:element name="IncludedSchemas" type="IncludedSchemaList"
            minOccurs="0"/><!-- The schemas to be included for external types -->
                <xsd:element name="NamespaceImports" type="NamespaceImports"
            minOccurs="0"/><!-- The namespaces to be imported -->
                <xsd:element name="SimpleTypeDefSchemaFileName"
            type="xsd:string" minOccurs="0"/> <!-- Full path to the file containing the
            simple type definitions -->
                <xsd:element name="SuperTypeDefs" type="SuperTypeDefList"
            minOccurs="0"/><!-- The list of super types -->
            </xsd:sequence>
        </xsd:complexType>
```

APPENDIX B-continued

Super type generator schema

```
<xsd:complexType name="IncludedSchemaList">
    <xsd:sequence>
        <xsd:element name="IncludedSchema" type="xsd:string"
    maxOccurs="unbounded"/>
    </xsd:sequence>
</xsd:complexType>
<xsd:complexType name="SuperTypeDefList">
    <xsd:sequence>
        <xsd:element name="SupertypeDef" type="SuperTypeDefBase"
    maxOccurs="unbounded"/>
    </xsd:sequence>
</xsd:complexType>
<xsd:complexType name="SuperTypeDefBase">
    <xsd:sequence>
        <xsd:element name="SupertypeType" type="SuperTypeEnum"/>
        <xsd:element name="SupertypeName" type="xsd:string"/>
        <xsd:element name="SupertypeBase" type="xsd:string"
    minOccurs="0"/>
        <xsd:element name="ChildrenInChoiceGroup" type="Choice"
    minOccurs="0"/>
        <xsd:element name="ChildrenList" type="ChildrenList"
    minOccurs="0"/>
    </xsd:sequence>
    <xsd:attribute name="versioned" type="xsd:boolean" use="optional"/>
</xsd:complexType>
<xsd:complexType name="ChildrenList">
    <xsd:sequence>
        <xsd:element name="Child" type="ChildBase"
    maxOccurs="unbounded"/>
    </xsd:sequence>
</xsd:complexType>
<xsd:complexType name="Choice">
    <xsd:sequence>
        <xsd:element name="Child" type="ChildBase"
    maxOccurs="unbounded"/>
    </xsd:sequence>
    <xsd:attribute name="Required" type="xsd:boolean" use="required"/>
</xsd:complexType>
<xsd:complexType name="ChildBase">
    <xsd:sequence>
        <xsd:element name="Name" type="xsd:string"/>
        <xsd:element name="Type" type="xsd:string"/>
        <xsd:element name="Cardinality" type=" Cardinality "/>
    </xsd:sequence>
</xsd:complexType>
<xsd:complexType name="NamespaceImports">
    <xsd:sequence>
        <xsd:element name="NamespaceImport"
    type="NamespaceImportBase" maxOccurs="unbounded"/>
    </xsd:sequence>
</xsd:complexType>
<xsd:complexType name="NamespaceImportBase">
    <xsd:sequence>
        <xsd:element name="NamespaceName" type="xsd:string"/>
        <xsd:element name="SchemaFileName" type="xsd:string"/>
        <xsd:element name="NamespacePrefix" type="xsd:string"/>
    </xsd:sequence>
</xsd:complexType>
<xsd:simpleType name="SuperTypeEnum">
    <xsd:restriction base="xsd:string">
        <xsd:enumeration value="Complex"/>
        <xsd:enumeration value="Complex-Repeating"/>
        <xsd:enumeration value="Element"/>
    </xsd:restriction>
</xsd:simpleType>
<xsd:simpleType name="Cardinality">
    <xsd:restriction base="xsd:string">
        <xsd:enumeration value="Optional"/>
        <xsd:enumeration value="Mandatory"/>
        <xsd:enumeration value="Unbounded"/>
    </xsd:restriction>
</xsd:simpleType>
</xsd:schema>
```

The invention claimed is:

1. A method for generating a schema for data asset information, the method comprising:
   accessing complex type information corresponding to a logical relational data model that defines an organization of the data asset information, the logical relational data model including a parent entity and child entities corresponding to the parent entity;
   treating the complex type information to produce scrubbed complex type information, said treating of the complex type information including removing at least one foreign key from at least one of the child entities;
   translating the scrubbed complex type information to produce a hierarchical data model corresponding to the logical relational data model, the hierarchical data model including a plurality of containers respectively corresponding to the child entities of the logical relational data model, the treating and translating being carried out such that the at least one foreign key removed from the at least one child entity is omitted from a first level container in the hierarchical data model and is present in a second level container in the hierarchical data model, the first level container paralleling the child entity from which the foreign key is removed, the second level container being at a higher level in the hierarchical data model than that of the first level container; and
   generating a schema for the data asset information based upon the hierarchical data model.

2. The method of claim 1, wherein said treating of the complex type information comprises replacing data types in the complex type information corresponding to the logical relational data model.

3. The method of claim 1, wherein said treating of the complex type information comprises merging one of the child entities into the parent entity.

4. The method of claim 1, further comprising:
   validating an electronic document using the schema.

5. The method of claim 4, wherein the electronic document is for a collateral security.

6. A non-transitory computer readable medium storing program code for generating a schema for data asset information, the program code being executable by a processor to perform operations comprising:
   accessing complex type information corresponding to a logical relational data model that defines an organization of the data asset information, the logical relational data model including a parent entity and child entities corresponding to the parent entity;
   treating the complex type information to produce scrubbed complex type information, said treating of the complex type information including removing at least one foreign key from at least one of the child entities;
   translating the scrubbed complex type information to produce a hierarchical data model corresponding to the logical relational data model, the hierarchical data model including a plurality of containers respectively corresponding to the child entities of the logical relational data model, the treating and translating being carried out such that the at least one foreign key removed from the at least one child entity is omitted from a first level container in the hierarchical data model and is present in a second level container in the hierarchical data model, the first level container paralleling the child entity from which the foreign key is removed, the second level container being at a higher level in the hierarchical data model than that of the first level container; and
   generating a schema for the data asset information based upon the hierarchical data model.

7. The computer readable medium of claim 6, wherein said treating of the complex type information comprises replacing data types in the complex type information corresponding to the logical relational data model.

8. The computer readable medium of claim 6, wherein said treating of the complex type information comprises merging one of the child entities into the parent entity.

9. The computer readable medium of claim 6, wherein the operations further comprise:
   validating an electronic document using the schema.

10. The computer readable medium of claim 9, wherein the electronic document is for a collateral security.

11. An apparatus for generating a schema for data asset information, the apparatus comprising:
    a processor; and
    a memory, the memory storing program code executable by the processor to perform operations comprising:
    accessing complex type information corresponding to a logical relational data model that defines an organization of the data asset information, the logical relational data model including a parent entity and child entities corresponding to the parent entity;
    treating the complex type information to produce scrubbed complex type information, said treating of the complex type information including removing at least one foreign key from at least one of the child entities;
    translating the scrubbed complex type information to produce a hierarchical data model corresponding to the logical relational data model, the hierarchical data model including a plurality of containers respectively corresponding to the child entities of the logical relational data model, the treating and translating being carried out such that the at least one foreign key removed from the at least one child entity is omitted from a first level container in the hierarchical data model and is present in a second level container in the hierarchical data model, the first level container paralleling the child entity from which the foreign key is removed, the second level container being at a higher level in the hierarchical data model than that of the first level container; and
    generating a schema for the data asset information based upon the hierarchical data model.

12. The apparatus of claim 11, wherein said treating of the complex type information comprises replacing data types in the complex type information corresponding to the logical relational data model.

13. The apparatus of claim 11, wherein said treating of the complex type information comprises merging one of the child entities into the parent entity.

14. The apparatus of claim 11, wherein the operations further comprise:
    validating an electronic document using the schema.

15. The apparatus of claim 14, wherein the electronic document is for a collateral security.

* * * * *